US009221299B2

(12) United States Patent
Harada et al.

(10) Patent No.: US 9,221,299 B2
(45) Date of Patent: Dec. 29, 2015

(54) WHEEL SUPPORT DEVICE (71) Applicant: JTEKT CORPORATION, Osaka-shi, Osaka (JP)

(72) Inventors: Katsuyuki Harada, Yamatokoriyama (JP); Hiroshi Anno, Sakai (JP)

(73) Assignee: JTEKT CORPORATION, Osaka-shi (JP)

( * ) Notice: Subject to any disclaimer, the term of this patent is extended or adjusted under 35 U.S.C. 154(b) by 338 days.

(21) Appl. No.: 13/774,175

(22) Filed: Feb. 22, 2013

(65) Prior Publication Data
US 2013/0229046 A1 Sep. 5, 2013

(30) Foreign Application Priority Data

Mar. 2, 2012 (JP) ................................. 2012-046509

(51) Int. Cl.
*B60B 27/00* (2006.01)
*B60B 27/06* (2006.01)
*F16C 35/063* (2006.01)

(52) U.S. Cl.
CPC ........... *B60B 27/065* (2013.01); *B60B 27/0031* (2013.01); *B60B 27/00* (2013.01); *B60B 27/0005* (2013.01); *B60B 27/0036* (2013.01); *B60B 27/0042* (2013.01); *B60B 27/0084* (2013.01); *B60B 27/0094* (2013.01); *F16C 35/063* (2013.01)

(58) Field of Classification Search
CPC B60B 27/00; B60B 27/0005; B60B 27/0084; B60B 27/0036; B60B 27/0042; B60B 27/065; B60B 27/0094
See application file for complete search history.

(56) References Cited

U.S. PATENT DOCUMENTS

| 4,460,058 | A  | * | 7/1984  | Welschof et al. ............. 180/258 |
| 4,893,960 | A  | * | 1/1990  | Beier et al. ...................... 403/24 |
| 8,052,332 | B2 | * | 11/2011 | Kamikawa et al. ........... 384/544 |
| 8,066,337 | B2 | * | 11/2011 | Tsuzaki et al. ............. 301/105.1 |
| 8,100,775 | B2 | * | 1/2012  | Hirai et al. .................... 464/178 |
| 8,210,752 | B2 | * | 7/2012  | Kamikawa et al. ........... 384/544 |

(Continued)

FOREIGN PATENT DOCUMENTS

DE 10 2005 018 127 A1 10/2006
EP 0 048 101 A1 3/1982

(Continued)

OTHER PUBLICATIONS

Extended European Search Report issued in Application No. 13156760.4; Dated Jun. 19, 2013.
Oct. 27, 2015 Office Action issued in Japanese Application No. 2012-046509.

*Primary Examiner* — Kip T Kotter
(74) *Attorney, Agent, or Firm* — Oliff PLC (57) ABSTRACT

A rotary ring of a hub unit has an annular first end face on one side in the axial direction, and an outer ring of a joint has an annular second end face on the other side in the axial direction. Outer splines are formed in a radially outer-side region of the first end face and outer splines are formed in a radially outer-side region of the second end face. The outer splines of the first end face and the outer splines of the second end face mesh with each other. Inner splines are formed in a radially inner-side region of the first end face and inner splines are formed in a radially inner-side region of the second end face. The inner splines of the first end face and the inner splines of the second end face mesh with each other.

4 Claims, 5 Drawing Sheets

(56) References Cited

U.S. PATENT DOCUMENTS

| | | |
|---|---|---|
| 8,246,256 B2 | 8/2012 | Langer et al. |
| 8,393,798 B2 * | 3/2013 | Nakagawa et al. ........... 384/544 |
| 8,512,157 B2 * | 8/2013 | Harada et al. ................. 464/178 |
| 2008/0156610 A1 | 7/2008 | Langer et al. |
| 2008/0193071 A1 | 8/2008 | Langer et al. |
| 2009/0108668 A1 * | 4/2009 | Kamikawa et al. ........... 301/109 |
| 2010/0021102 A1 * | 1/2010 | Fukumura et al. ............ 384/589 |
| 2010/0038958 A1 * | 2/2010 | Tsuzaki et al. ................ 301/125 |

FOREIGN PATENT DOCUMENTS

| | | |
|---|---|---|
| EP | 2 045 100 A2 | 4/2009 |
| JP | 2008247072 A * | 10/2008 |
| JP | 2008-539387 A | 11/2008 |
| JP | A-2008-284920 | 11/2008 |
| JP | 2010-137676 A | 6/2010 |

* cited by examiner

WHEEL SUPPORT DEVICE

INCORPORATION BY REFERENCE

The disclosure of Japanese Patent Application No. 2012-046509 filed on Mar. 2, 2012 including the specification, drawings and abstract, is incorporated herein by reference in its entirety.

BACKGROUND OF THE INVENTION

1. Field of the Invention

The invention relates to a wheel support device.

2. Description of Related Art

Figure 5:
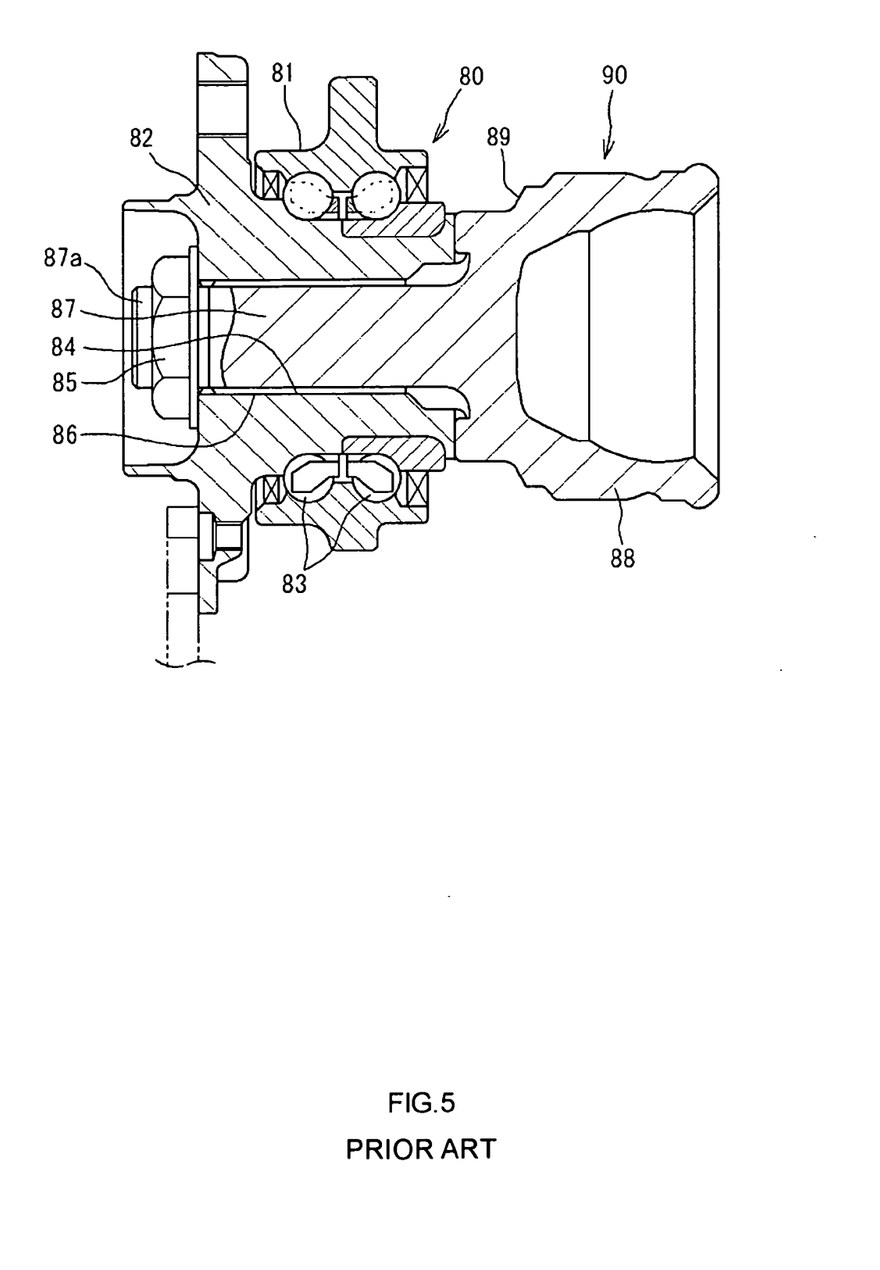
FIG. 5 is a sectional view that shows an example of a hub unit and an outer ring of a joint according to related art.

In order to support a wheel such that the wheel is rotatable with respect to a suspension provided on a body of a vehicle, for example, a wheel support device shown in FIG. 5 is used. The wheel support device includes a hub unit 80 and a joint 90 that transmits torque to the hub unit 80.

The hub unit 80 includes a fixed ring 81, a rotary ring 82, and rolling elements 83. Internal splines 84 are formed in the inner periphery of the rotary ring 82. The fixed ring 81 is fixed to the suspension. The wheel is connected to the rotary ring 82. The rolling elements 83 are arranged between the fixed ring 81 and the rotary ring 82. The joint 90 has an outer ring 89. The outer ring 89 has a tubular body portion 88 and a shaft portion 87. The shaft portion 87 extends from the body portion 88 in the axial direction. External splines 86 that mesh with the internal splines 84 are formed on the outer periphery of the shaft portion 87 so that torque transmission between the hub unit 80 and the joint 90 is allowed.

When the configuration shown in FIG. 5 is employed, many processes are required to assemble the hub unit 80 and the joint 90 together. That is, the following processes are required. First, an alignment for positioning the hub unit 80 and the outer ring 89 of the joint 90 such that the hub unit 80 and the outer ring 89 extend along the same straight line is performed (first process). The shaft portion 87 of the joint 90 is press-fitted (temporarily press-fitted) into the rotary ring 82, and the distal end of the shaft portion 87 is protruded from an axial end face (left end face in FIG. 5) of the rotary ring 82 (second process). A temporary nut (not shown) is screwed to a threaded portion 87a formed at the distal end of the shaft portion 87 (third process). By screwing the temporary nut to the threaded portion 87a, the shaft portion 87 is press-fitted (fully press-fitted) into the rotary ring 82 until no gap remains between the rotary ring 82 of the hub unit 80 and the outer ring 89 of the joint 90 (fourth process). The temporary nut is removed from the shaft portion 87 (fifth process). A nut 85 is fastened to the threaded portion 87a of the shaft portion 87 (sixth process). The nut 85 is fixed to the axial end face of the rotary ring 82 by crimping, or the like, to prevent loosening of the nut 85 (seventh process). As shown in FIG. 5, the shaft portion 87 is press-fitted into the rotary ring 82 so that the external splines 86 that extend in the axial direction mesh with the internal splines 84 that extend in the axial direction. Therefore, particularly strict dimensional control is required to form the splines 86, 84. As a result, many man-hours are required also in the process of forming the splines.

Therefore, in order to make it easier to assemble a hub unit and a joint together, for example, a wheel support device (wheel bearing device) described in Japanese Patent Application Publication No. 2008-284920 (JP 2008-284920 A) (see FIG. 4) is used. In the wheel support device, first splines are formed in an annular end face (side face) of a rotary ring of the hub unit, the annular end face being on one side of the rotary ring in the axial direction. In addition, second splines that mesh with the first splines are formed in an annular end face (side face) of an outer ring of the joint, the annular end face being on the other side of the outer ring in the axial direction. The first splines are formed in substantially the entirety of the annular end face of the rotary ring. The second splines are formed in substantially the entirety of the annular end face of the outer ring.

In the case of the wheel support device described in JP 2008-284920 A (see FIG. 4), the hub unit and the joint are assembled together in the following manner. First, the hub unit and the outer ring of the joint are arranged so as to face each other in the axial direction. Then, the first splines of the hub unit and the second splines of the joint are meshed with each other. After that, the hub unit and the outer ring of the joint are fastened together with a bolt.

In the case of the wheel support device described in JP 2008-284920 A (see FIG. 4), it is easy to assemble the hub unit and the joint together. However, in order to form the first splines and the second splines, a plurality of radially long spline grooves (spline protrusions), which extend continuously from the inner peripheral edge of the annular end face to the outer peripheral edge of the annular end face, need to be arranged along the entire circumference of the annular end face. Therefore, in order to form the splines through plastic working with the use of, for example, a press, a large pressing load is required. In addition, in order to accurately form the entirety of the splines, a high-level working technique is required. The number of spline grooves (protrusions) may be reduced in order to easily form the splines. However, in this case, a required torque may not be transmitted.

SUMMARY OF THE INVENTION

It is an object of the invention to provide a wheel support device that has a spline structure that allows easy formation of splines and that allows transmission of a required torque.

An aspect of the invention relates to a wheel support device, including: a hub unit that includes a fixed ring that is fixed to a vehicle body-side member, a rotary ring to which a wheel is fitted, and rolling elements that are provided between the fixed ring and the rotary ring; and a joint that is provided on one side of the hub unit in an axial direction, and that has a torque transmission ring that transmits rotary torque to the rotary ring. The rotary ring has an annular first end face on one side in the axial direction, and the torque transmission ring has an annular second end face on the other side in the axial direction. Outer splines are formed in a radially outer-side region of the first end face and outer splines are formed in a radially outer-side region of the second end face, and the outer splines of the first end face and the outer splines of the second end face mesh with each other. Inner splines are formed in a radially inner-side region of the first end face and inner splines are formed in a radially inner-side region of the second end face, and the inner splines of the first end face and the inner splines of the second end face mesh with each other.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
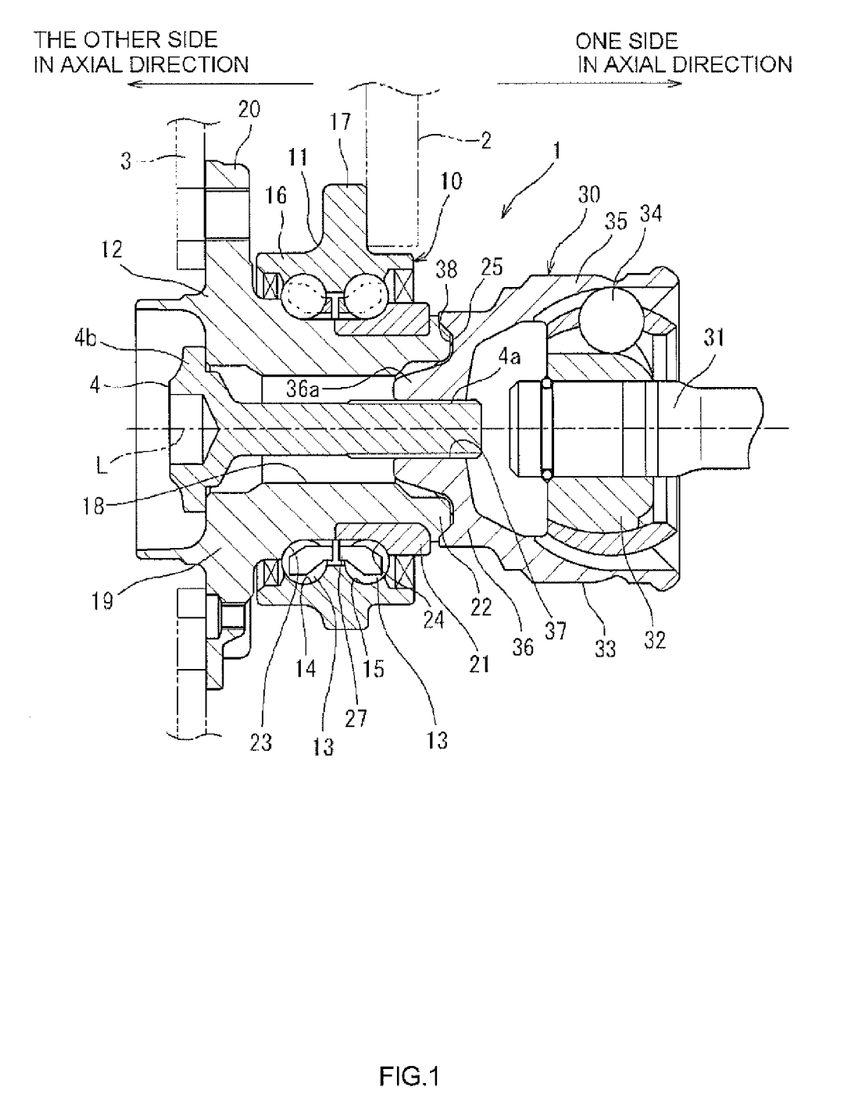
FIG. 1 a longitudinal sectional view that shows a wheel support device according to an embodiment of the invention.

An embodiment of the invention will be described with reference to the accompanying drawings. FIG. 1 is a longitudinal sectional view that shows a wheel support device 1 that includes a hub unit 10 and a joint 30 according to one embodiment of the invention. The hub unit 10 is fitted to a suspension 2 provided on a body of a vehicle, and is used to support a wheel 3 such that the wheel 3 is rotatable with respect to the suspension 2. The joint 30 is coupled to the hub unit 10, and is used to transmit rotary torque to a rotary ring 12 of the hub unit 10. The hub unit 10 and the joint 30 are fixedly coupled to each other with a bolt 4 that serves as a coupling member.

The lateral direction of the vehicle coincides with the axial direction of the wheel support device 1. The hub unit 10 and the joint 30 are provided side by side in the lateral direction of the vehicle. The hub unit 10 is provided outward of the joint 30 in the lateral direction, and the joint 30 is provided inward of the hub unit 10 in the lateral direction. In FIG. 1, the right side is one side in the axial direction (inner side in the lateral direction of the vehicle), and the left side is the other side in the axial direction (outer side in the lateral direction of the vehicle).

The hub unit 10 includes a fixed ring 11, the rotary ring 12, and balls (rolling elements) 13. The fixed ring 11 is fixed to the suspension 2 with bolts (not shown). The wheel 3 is fitted to the rotary ring 12. The balls 13 are provided between the fixed ring 11 and the rotary ring 12. The fixed ring 11 is arranged radially outward of the rotary ring 12, and a center line L of the rotary ring 12 coincides with the center line of the fixed ring 11.

The fixed ring 11 has a tubular body portion 16 and a flange portion 17. Raceway surfaces 14, 15 are formed on the inner periphery of the body portion 16. The flange portion 17 extends radially outward from the body portion 16. The flange portion 17 is fixed to the suspension 2. Thus, the hub unit 10 is fixed to the vehicle body-side member.

The rotary ring 12 has a hollow shaft portion 19, a flange portion 20, and an annular inner ring member 21. A through-hole 18 is formed at the center of the shaft portion 19. The flange portion 20 extends radially outward from a portion of the shaft portion 19, the portion being on the other side of the shaft portion 19 in the axial direction. The inner ring member 21 is fitted onto a portion of the shaft portion 19, the portion being on one side of the shaft portion 19. The through-hole 18 is formed so as to linearly extend along the center line L of the rotary ring 12. The inner ring member 21 is fixed to the shaft portion 19 by being clinched by a large-diameter portion 22. The large-diameter portion 22 is formed by plastically deforming an end portion of the shaft portion 19 radially outward, the end portion being on the one side of the shaft portion 19 in the axial direction. Raceway surfaces 23, 24 are formed on the outer periphery of the shaft portion 19 and the outer periphery of the inner ring member 21, respectively. The large-diameter portion 22 of the rotary ring 12 has an annular first end face 25, the first end face 25 being on one side (right side in FIG. 1) of the large-diameter portion 22 in the axial direction. In the first end face 25, outer splines (outer spline teeth) 51 and inner splines (inner spline teeth) 52 are formed as first splines (spline teeth) (see FIG. 3).

A portion in which the outer splines 51 and the inner splines 52 are formed is the large-diameter portion 22 that is formed at an end portion of the rotary ring 12, the end portion being on one side of the rotary ring 12 in the axial direction. The large-diameter portion 22 is formed by increasing the diameter of the end portion of the shaft portion 19 of the rotary ring 12, the end portion being on one side of the shaft portion 19 in the axial direction, radially outward through plastic working. In the present embodiment, the plastic working is oscillating clinching. During formation of the large-diameter portion 22 through the oscillating clinching, the outer splines 51 and the inner splines 52 are formed in the large-diameter portion 22. That is, although not shown in the drawing, a tooth profile for forming the outer splines 51 and the inner splines 52 is formed in a die member (die) used for oscillating clinching. The tooth profile of this die member is transferred to the large-diameter portion 22 so that the outer splines 51 and the inner splines 52 are formed.

As shown in FIG. 1, the balls 13 are arranged in the circumferential direction, and are arranged in two rows. The balls 13 arranged in one of the rows roll on the raceway surfaces 14, 23, and the balls 13 arranged in the other row roll on the raceway surfaces 15, 24. The balls 13 in each row are retained at equal intervals in the circumferential direction by a cage 27. The balls 13, the fixed ring 11 and the rotary ring 12 constitute a double-row angular contact ball bearing.

The joint 30 includes an inner ring 32, an outer ring 33 and a plurality of balls 34. The inner ring 32 is fixed to an end portion of a drive shaft 31, the end portion being on the other side of the drive shaft 31 in the axial direction. The outer ring 33 is arranged radially outward of the inner ring 32. The balls 34 are arranged between the inner ring 32 and the outer ring 33. The joint 30 is a constant velocity joint in the present embodiment. The outer ring 33 has a closed-end cylindrical shape. The outer ring 33 has a tubular portion 35 and a bottom portion 36. The tubular portion 35 has a tubular shape. The bottom portion 36 is integrated with a portion of the tubular portion 35, the portion being on the other side of the tubular portion 35 in the axial direction. A small tubular portion 36a that extends toward the other side in the axial direction (outward in the lateral direction of the vehicle) is formed at the center of the bottom portion 36. A bolt hole 37 is defined by the inner periphery of the small tubular portion 36a. A threaded portion 4a that is formed at the distal end of the bolt 4 is screwed into the bolt hole 37.

In the joint 30, the outer ring 33 has the function as a torque transmission ring that transmits rotary torque to the rotary ring 12 of the hub unit 10. Therefore, the bottom portion 36 of the outer ring 33 has an annular second end face 38, the second end face 38 being on the other side of the bottom portion 36 in the axial direction. Second splines (spline teeth) 39 that are meshed with the first splines 26 of the hub unit 10 are formed in the end face 38. Outer splines (outer spline teeth) 61 and inner splines (inner spline teeth) 62 are formed on the second end face 38 as second splines (spline teeth) that are in mesh with the first splines of the hub unit 10 (see FIG. 3).

Figure 2:
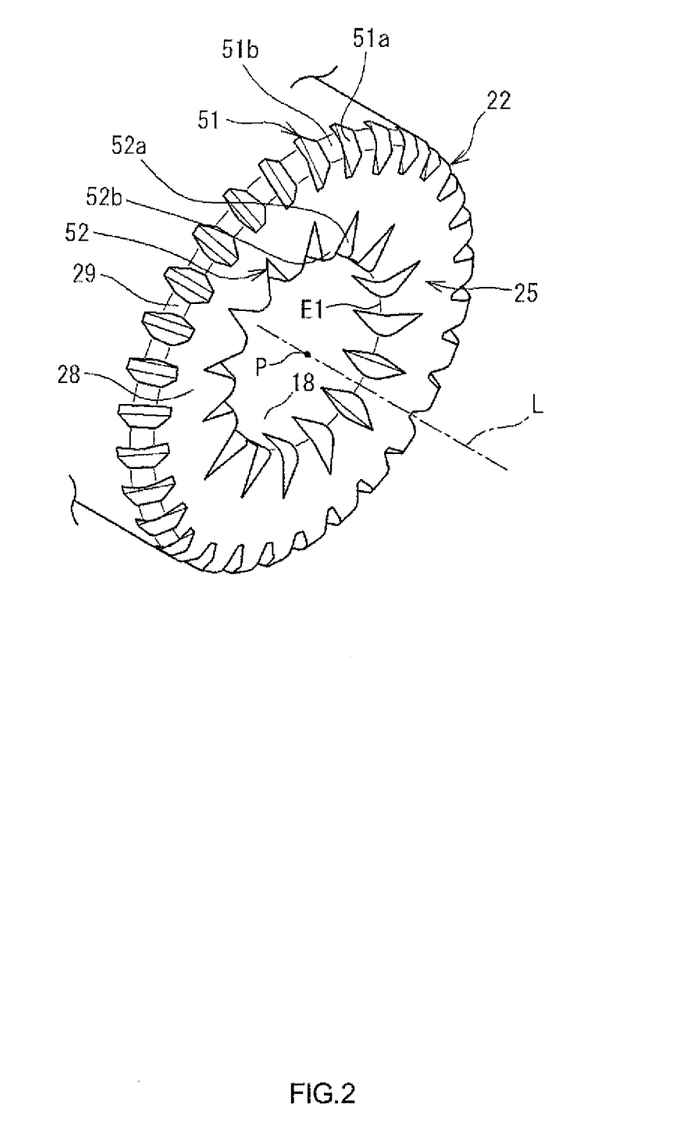
FIG. 2 is a perspective view of an end face of a rotary ring of a hub unit, the end face being on one side of the rotary ring in the axial direction.

FIG. 2 is a perspective view of the first end face 25 of the rotary ring 12 (large-diameter portion 22) of the hub unit 10.

Figure 3:
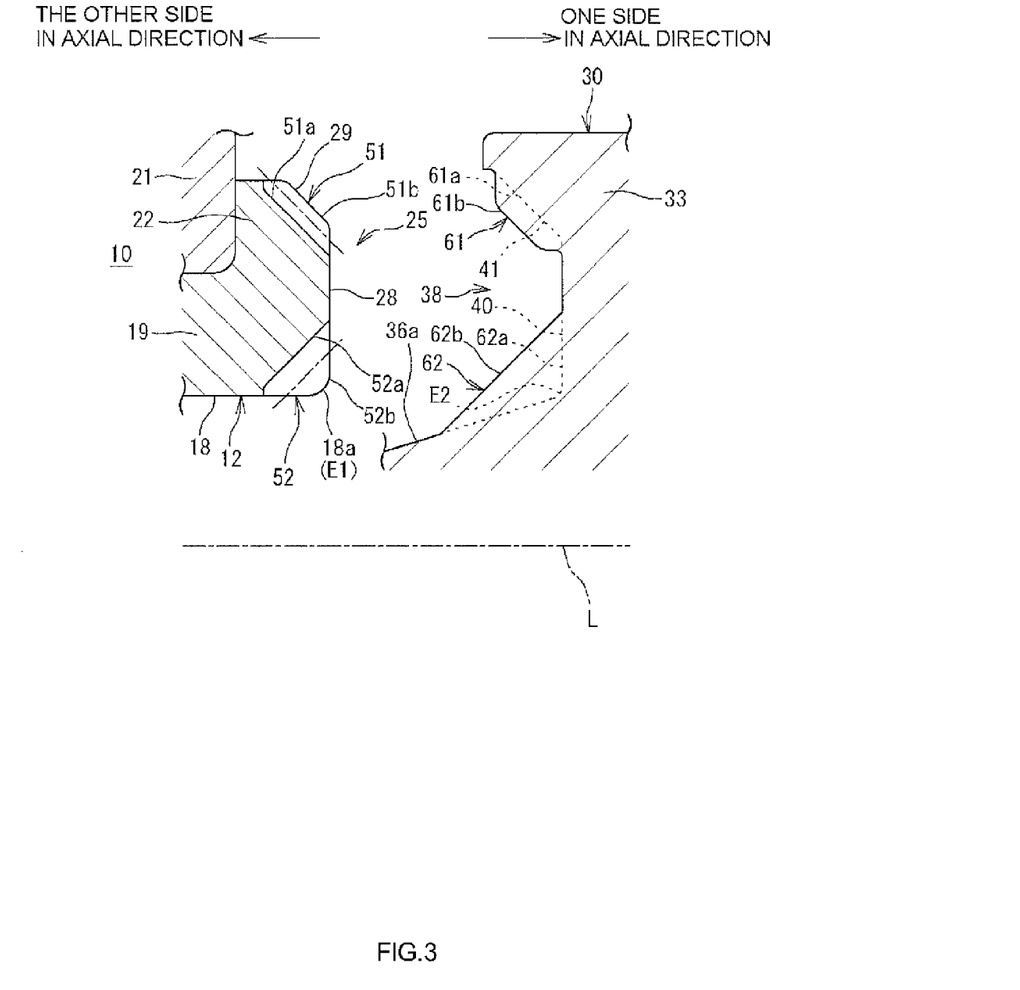
FIG. 3 is a sectional view that shows an end portion of the rotary ring of the hub unit, the end portion being on one side of the rotary ring in the axial direction, and an end portion of an outer ring of a joint, the end portion being on the other side of the outer ring in the axial direction.

FIG. 3 is a sectional view that shows an end portion (large-diameter portion 22) of the rotary ring 12, the end portion being on one side of the rotary ring 12 in the axial direction, and an end portion of the outer ring 33 of the joint 30, the end portion being on the other side of the outer ring 33 in the axial direction. The large-diameter portion 22 of the rotary ring 12 has the annular first end face 25, the annular first end face 25 being on one side of the large-diameter portion 22 in the axial direction. The first end face 25 has an annular side face 28 in a region from its inner peripheral edge to its radially intermediate position. The annular side face 28 faces toward the one side in the axial direction (inward in the lateral direction of the vehicle). The first end face 25 has a tapered outer periphery 29 in a region radially outward of the annular side face 28. The diameter of the tapered outer periphery 29 increases toward the other side in the axial direction (outward in the lateral direction of the vehicle). The annular side face 28 is formed of an annular face that has an opening 18a of the through-hole 18 (see FIG. 1) at its center, and is perpendicular to the center line L of the rotary ring 12. The diameter of the tapered outer periphery 29 increases from the outer peripheral edge of the annular side face 28 toward the other side in the axial direction (outward in the lateral direction of the vehicle). The tapered outer periphery 29 is formed of an inclined surface that is inclined with respect to the center line L.

In the joint 30 shown in FIG. 3, the outer ring 33 has the annular second end face 38. The annular second end face 38 is on the other side of the outer ring 33 in the axial direction, and is located radially outward of the small tubular portion 36a. The second end face 38 has an annular side face 40 in a region from the base portion of the small tubular portion 36a to its radially intermediate position. The annular side face 40 faces toward the other side in the axial direction (outward in the lateral direction of the vehicle). Furthermore, the second end face 38 has a tapered inner periphery 41 in a region radially outward of the annular side face 40. The diameter of the tapered inner periphery 41 increases toward the other side in the axial direction (outward in the lateral direction of the vehicle). The tapered inner periphery 41 faces the tapered outer periphery 29 of the hub unit 10. In addition, the annular side face 40 faces the annular side face 28. The annular side face 40 is a face perpendicular to the center line L of the outer ring 33. The diameter of the tapered inner periphery 41 increases from the outer peripheral edge of the annular side face 40 toward the axial other side (outward in the lateral direction of the vehicle). The tapered inner periphery 41 is formed of an inclined surface that is inclined with respect to the center line of the outer ring 33.

The outer splines 51, 61, which mesh with each other, are formed respectively in the tapered outer periphery 29 and the tapered inner periphery 41, which are on the radially outer side. Furthermore, the inner splines 52, 62, which mesh with each other, are formed respectively in a portion including the annular side face 28 and a portion including the annular side face 40, the portions being on the radially inner side. When the outer splines 51, 61 mesh with each other and the inner splines 52, 62 mesh with each other, torque is transmitted between the rotary ring 12 of the hub unit 10 and the outer ring 33 of the joint 30.

In the hub unit 10, the outer splines 51 are formed in the tapered outer periphery 29 that is the radially outer-side region of the first end face 25. As shown in FIG. 2, the outer splines 51 are formed of a plurality of spline grooves 51a and a plurality of spline protrusions 51b. The spline grooves 51a and the spline protrusions 51b are alternately formed in the circumferential direction. The spline grooves 51a are formed at equal intervals in the circumferential direction, and the spline protrusions 51b are also formed at equal intervals in the circumferential direction. As shown in FIG. 2 and FIG. 3, the longitudinal direction of each spline groove 51a (the longitudinal direction of each spline protrusion 51b) is a direction parallel to the tapered outer periphery 29, and the outer splines 51 are formed such that the top face of each spline protrusion 51b coincides with the tapered outer periphery 29.

In the hub unit 10, the inner splines 52 are formed in an inner peripheral edge portion E1 that includes an intersection portion between the annular side face 28 and the inner periphery of the through-hole 18. The inner peripheral edge portion E1 is the radially inner-side region of the first end face 25. As shown in FIG. 2, the inner splines 52 are formed of a plurality of spline grooves 52a and a plurality of spline protrusions 52b that are alternately formed in the circumferential direction. The spline grooves 52a are formed at equal intervals in the circumferential direction, and the spline protrusions 52b are also formed at equal intervals in the circumferential direction. As shown in FIG. 2 and FIG. 3, the inner splines 52 are formed such that part of the annular side face 28 coincides with one of the tooth tip faces of each spline protrusion 52b and part of the inner periphery, which defines the through-hole 18, coincides with another one of the tooth tip faces of each spline protrusion 52b.

In the joint 30, as shown in FIG. 3, the outer splines 61 that are in mesh with the outer splines 51 of the hub unit 10 are formed in the tapered inner periphery 41 that is the radially outer-side region of the second end face 38. The outer splines 61 are formed of a plurality of spline grooves 61a and a plurality of spline protrusions 61b that are alternately formed in the circumferential direction (see FIG. 3). The longitudinal direction of each spline groove 61a (the longitudinal direction of each spline protrusion) is a direction parallel to the tapered inner periphery 41, and the outer splines 61 are formed such that the bottom face of each spline groove 61a coincides with the tapered inner periphery 41.

In the joint 30, the inner splines 62 are formed in an outer peripheral corner portion E2 that includes an intersection portion between the annular side face 40 and the outer periphery of a base portion of the small tubular portion 36a. The outer peripheral corner portion E2 is the radially inner-side region of the second end face 38. The inner splines 62 are formed of a plurality of spline grooves 62a and a plurality of spline protrusions 62b that are alternately formed in the circumferential direction (see FIG. 3). The inner splines 62 are formed such that part of the annular side face 40 coincides with one of the bottom faces of each spline groove 62a and the outer periphery of the base portion of the small tubular portion 36a coincides with another one of the bottom faces of each spline groove 62a.

As shown in FIG. 2, in the first end face 25, the grooves 51a of the outer splines 51 and the grooves 52a of the inner splines 52 are formed independently from each other. In addition, the protrusions 51b of the outer splines 51 and the protrusions 52b of the inner splines 52 are formed independently from each other. That is, the grooves 51a and the grooves 52a are not continuous with each other, and the grooves 51a and the grooves 52a are formed separately from each other in the radial direction. Similarly, the protrusions 51b and the protrusions 52b are not continuous with each other, and the protrusions 51b and the protrusions 52b are formed separately from each other in the radial direction.

Thus, as shown in FIG. 3, the wheel support device 1 according to the present embodiment has the following spline structure. That is, the outer splines 51, 61, which mesh with each other, are respectively formed in the radially outer-side region of the first end face 25 and the radially outer-side region of the second end face 38. The inner splines 52, 62, which mesh with each other, are respectively formed in the radially inner-side region of the first end face 25 and the radially inner-side region of the second end face 38. Further, the inner splines 52, 62, which mesh with each other, are formed independently from the outer splines 51, 61.

Figure 4:
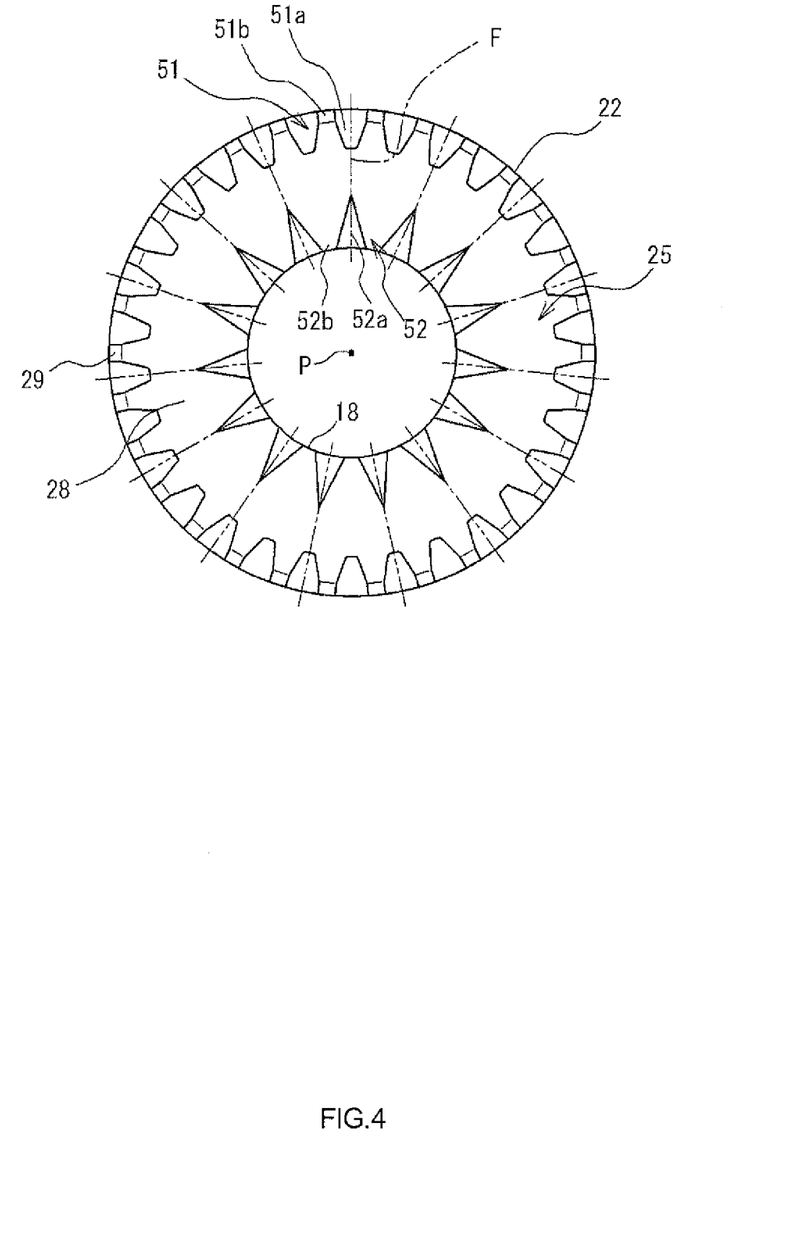
FIG. 4 is a view that shows the end face of the rotary ring, the end face being on one side of the rotary ring in the axial direction, when the end face is viewed from one side toward the other side in the axial direction.

The number of the grooves 52a of the inner splines 52 is smaller than the number of the grooves 51a of the outer splines 51. The number of the protrusions 52b of the inner splines 52 is smaller than the number of the protrusions 51b of the outer splines 51. Particularly, the number of the spline grooves 52a of the inner splines 52 is set to 1/n (where n is an integer) of the number of the spline grooves 51a of the outer splines 51. In the present embodiment, as shown in FIG. 4, the number of the spline grooves 52a of the inner splines 52 is "15"; whereas the number of the spline grooves 51a of the outer splines 51 is "30". Therefore, the ratio of the number of spline grooves 52a to the number of the spline grooves 51a is ½. That is, the integer n is set to 2. The value of the integer n may be set to an integer other than "2", and may be "3" or more.

Furthermore, when the first end face 25 is viewed from the one side toward the other side in the axial direction (see FIG. 4), the spline grooves 51a of the outer splines 51 are formed at equal intervals in the circumferential direction, and the spline grooves 52a of the inner splines 52 are formed at equal intervals in the circumferential direction. The radially inner-side spline grooves 52a are formed on straight lines (extension lines F) that respectively extend from some of the radially outer-side spline grooves 51a toward point P on the center line of the rotary ring 12. That is, the spline grooves 52a of the inner splines 52 are arranged on the extension lines that extend radially inward from some of the spline grooves 51a of the outer splines 51. The extension lines F are lines that respectively pass through the groove width centers of the radially outer-side spline grooves 51a and point P on the center line of the rotary ring 12. The extension lines F pass through the groove width centers of the radially inner-side spline grooves 52a.

In this way, the radially outer-side spline groove 51a and the radially inner-side spline groove 52a are arranged on the single straight line (extension line F). Thus, even if the accuracy (accuracy after manufacturing) of the inner splines 52 or the outer splines 51 is low, it is easy to engage the splines, which face each other, with each other by bringing the rotary ring 12 of the hub unit 10 and the outer ring 33 of the joint 30 close to each other in the axial direction.

In the wheel support device 1 according to the above-described embodiment, in the end face 25 of the rotary ring 12 of the hub unit 10 and the end face 38 of the outer ring 33 of the joint 30, the outer splines 51, 61 are respectively formed in the radially outer-side regions, and the inner splines 52, 62 are respectively formed in the radially inner-side regions. The outer splines 51, 61 are formed independently from the inner splines 52, 62, respectively. This structure differs from the conventional structure in which the radially long spline grooves (spline protrusions) that are formed continuously from the inner peripheral edge of the annular end face to the outer peripheral edge of the end face are arranged along the entire circumference of the annular end face. Therefore, a load required to perform oscillating clinching to form the splines 51, 52, 61, 62 is smaller than that in related art. Therefore, it becomes easy to form the splines. The splines are formed in both the radially outer-side region and the radially inner-side region of each of the end faces 25, 38. Therefore, a sufficient spline length is ensured, and it is possible to transmit a required torque.

Particularly, in the present embodiment, in the hub unit 10, the outer splines 51 are formed in the tapered outer periphery 29 of which the diameter increases toward the other side in the axial direction (outward in the lateral direction of the vehicle), and, in the joint 30, the outer splines 61 are formed in the tapered inner periphery 41 of which the diameter increases toward the other side in the axial direction (outward in the lateral direction of the vehicle). Therefore, the length of each spline becomes long. Accordingly, it is possible to transmit torque that is substantially equal to that in the conventional spline structure.

As shown in FIG. 1, the hub unit 10 and the joint 30 according to the present embodiment are assembled together in the following manner. First, the rotary ring 12 of the hub unit 10 and the outer ring 33 of the joint 30 are arranged so as to face each other in the axial direction. Then, the splines 51, 52 (see FIG. 3) formed in the end face 25 of the rotary ring 12 and the second splines 61, 62 (see FIG. 3) formed in the end face 38 of the outer ring 33 are meshed with each other. After that, the hub unit 10 and the joint 30 are fastened together with the bolt 4. In this way, in order to allow transmission of torque between the rotary ring 12 and the outer ring 33, it is only necessary to bring the rotary ring 12 and the outer ring 33 close to each other in the axial direction, and mesh the first splines of the rotary ring 12 and the second splines of the outer ring 33 with each other. Therefore, assembly is easily performed.

The bolt 4 is a member that couples the rotary ring 12 and the outer ring 33, which are arranged so as to extend along the same straight line, by fastening the rotary ring 12 and the outer ring 33 to each other in the axial direction. The bolt 4 has a bolt head 4b and a threaded portion 4a. The bolt head 4b is larger in diameter than the through-hole 18 of the rotary ring 12. The threaded portion 4a is screwed into the bolt hole 37 that is formed in the outer ring 33. The distal end portion (threaded portion 4a) of the bolt 4 is inserted into the through-hole 18 from the other side in the axial direction, and is screwed into the bolt hole 37. In this way, the bolt 4 couples the rotary ring 12 to the outer ring 33 by fastening the rotary ring 12 to the outer ring 33 in the axial direction. In a state where the bolt 4 is fastened and an axial tension acts on the bolt 4, the hub unit 10 and the joint 30 are coupled to each other and rotary torque is transmitted from the joint 30 to the hub unit 10.

The wheel support device according to the invention is not limited to the one in the illustrated embodiment, and may be implemented in various other embodiments within the scope of the invention. For example, the joint 30 may be a joint other than the constant velocity joint. In the above-described embodiment, a torque transmission ring of the joint 30 is the closed-end cylindrical outer ring 33 (see FIG. 1). Alternatively, a torque transmission ring may be a member that has another shape.

In the wheel support device according to the invention, the splines are formed in the radially outer-side region and the radially inner side-region of each of the annular end faces independently of each other. Therefore, it becomes easy to form the splines as compared with the related art, and, in addition, the splines are formed in both the radially outer side-region and the radially inner-side region. Therefore, each spline has a sufficient length. As a result, it is possible to transmit a required torque.

What is claimed is:
1. A wheel support device, comprising:
a hub unit that includes a fixed ring that is fixed to a vehicle body-side member, a rotary ring to which a wheel is fitted, and rolling elements that are provided between the fixed ring and the rotary ring; and a joint that is provided on one side of the hub unit in an axial direction, and that has a torque transmission ring that transmits rotary torque to the rotary ring, wherein the rotary ring has an annular first end face on one side in the axial direction, and the torque transmission ring has an annular second end face on the other side in the axial direction, outer splines are formed in a radially outer-side region of the first end face and outer splines are formed in a radially outer-side region of the second end face, and the outer splines of the first end face and the outer splines of the second end face mesh with each other, inner splines are formed in a radially inner-side region of the first end face and inner splines are formed in a radially inner-side region of the second end face, and the inner splines of the first end face and the inner splines of the second end face mesh with each other, the first end face includes a first outer surface which extends substantially perpendicular to the axial direction and is formed between the radially outer-side region and the radially inner-side region. and no spline being formed on the first outer surface, and the second end face includes a second outer surface which extends substantially perpendicular to the axial direction and is formed between the radially outer-side region and the radially inner-side region, and no spline being formed on the second outer surface.

2. The wheel support device according to claim 1, wherein:

a tapered outer periphery of which a diameter increases toward the other side in the axial direction is formed in the radially outer-side region of the first end face;

a tapered inner periphery of which a diameter increases toward the other side in the axial direction and which faces the tapered outer periphery of the first end face is formed in the radially outer-side region of the second end face; and the outer splines are formed in each of the tapered outer periphery of the first end face and the tapered inner periphery of the second end face.

3. The wheel support device according to claim 2, wherein:

the number of spline grooves of the inner splines is 1/n, where n is an integer, of the number of spline grooves of the outer splines; and the spline grooves of the inner splines are arranged on extension lines that extend radially inward from the spline grooves of the outer splines.

4. The wheel support device according to claim 1, wherein:

the number of spline grooves of the inner splines is 1/n, where n is an integer, of the number of spline grooves of the outer splines; and the spline grooves of the inner splines are arranged on extension lines that extend radially inward from the spline grooves of the outer splines.

* * * * *